XR 3,042,904 CROSS REFERENCE SEARCH ROO

LOGICAL AND MEMORY ELEMENTS AND CIRCUITS

Filed Nov. 9, 1956 5 Sheets-Sheet 1

INVENTORS
ANDREW E. BRENNEMANN
RALPH B. DELANO JR.
DONALD R. YOUNG
BY John E. Dougherty Jr
AGENT 3,042,904
Patented July 3, 1962

3,042,904
LOGICAL AND MEMORY ELEMENTS AND CIRCUITS

Andrew E. Brennemann, Ralph B. De Lano, Jr., and Donald R. Young, Poughkeepsie, N.Y., assignors to International Business Machines Corporation, New York, N.Y., a corporation of New York Filed Nov. 9, 1956, Ser. No. 621,348
5 Claims. (Cl. 340—173.2)

The present invention relates to circuits which employ piezoelectric or ferroelectric elements and more particularly to circuits employing elements of this type which are provided with either one pair of input electrodes and a plurality of pairs of output electrodes or one pair of output electrodes and a plurality of pairs of input electrodes and wherein outputs are developed between the output electrodes in response to a single sonic wave or a combination of sonic waves propagated in the element when pulses are applied to the input electrodes.

Most of the piezoelectric devices known in the art are essentially single input, single output devices. The primary use of piezoelectric structures has heretofore been in delay line applications wherein inputs are applied to one pair of input terminals and an output developed after a predetermined delay between a pair of output terminals. In some applications, generally known as tapped delay lines, a plurality of output terminals have been connected at various points along a piezoelectric element for producing a plurality of timed outputs in response to a single input pulse which causes a sonic wave to be propagated in the element. A structure of this nature is shown in the Patent No. 2,711,515, issued June 21, 1955, to W. P. Mason. This patent discloses a tapped delay line in which a pair of input electrodes is connected at one end of a bar of barium titanate and a plurality of pairs of output electrodes are connected at successive points along the length of the bar. A suggestion, as to possibility of utilizing delay lines of this nature in storage applications, is found in the Mellon Institute Quarterly Report No. 3, pp. VII–1, VII–2, July 11, 1951.

In each of the above-mentioned structures of the prior art, the successive pairs of output electrodes are separated from the input electrodes by different amounts and sonic waves, propagated in the barium titanate when the material between the input electrodes is stressed, pass between the successive pairs of output terminals during successive time intervals. In neither of these structures nor in the known prior art has it been suggested that a plurality of output electrodes be mounted on a piezoelectric element sonically equidistant from a single pair of input electrodes. By the term sonically equidistant is meant that the pairs of electrodes are so mounted that a sonic wave propagated by straining the material between the single pair of input electrodes passes between each of the pairs of output electrodes at the same time. Nor has it been heretofore known to provide a piezoelectric element having a plurality of pairs of input electrodes spaced from a single pair of output electrodes so that straining of the piezoelectric material between any pair of input electrodes causes a sonic wave to be propagated which similarly strains the material between the output electrodes.

A primary object of the present invention is to provide a piezoelectric element having a single pair of output electrodes for developing an output signal in response to sonic waves transmitted in the element when portions of the material between any of a plurality of pairs of input electrodes are strained.

Another object is to provide an element of this nature wherein each of the pairs of input electrodes is sonically equidistant from the single pair of output electrodes.

A related object is to provide a novel piezoelectric logical circuit element constructed in the above manner wherein inputs are coincidently applied to the pairs of input electrodes and the outputs developed between the output electrodes are representative of the combination of the sonic waves which coincidently pass between the output electrodes.

A further object is to provide a novel circuit element having a plurality of pairs of output electrodes sonically equidistant from a single pair of input electrodes.

These objects are achieved according to one embodiment of the invention by providing a piezoelectric element wherein a plurality of pairs of electrodes are mounted in a circular arrangement around a single pair of centrally located electrodes. The material employed in the illustrative preferred embodiments herein disclosed is barium titanate. This material, is ferroelectric but when subjected to pulses less than the coercive voltage for the material, exhibits a relationship between electrical stress and dimensional strain which, as is discussed in detail in the copending application, Serial No. 596,707 filed July 9, 1956, in behalf of A. E. Brennemann and assigned to the assignee of this appplication, is essentially linear and may therefore be considered piezoelectric. Further it has been discovered that single crystal barium titanate is particularly suited for use in the invention herein disclosed since sonic waves may be propagated in a number of directions at essentially uniform velocities in these crystals.

According to one embodiment of the invention a universal logical element is provided wherein a plurality of pairs of input electrodes are arranged in circular fashion around a centrally located pair of output electrodes. The input electrodes are mounted with each pair being sonically equidistant from the centrally located output electrodes so that sonic waves, propagated when pulses are coincidently applied to the input electrodes, pass between the output electrodes at the same time. These sonic waves may be either of the "compression" or "expansion" type and the sonic waves of the same type arriving coincidently between the output electrodes produce a cumulative converse piezoelectric effect and, because of the linearity of the response, two such waves of equal magnitude arriving coincidently between the output electrodes cause an output to be developed which is essentially twice that which would be developed in response to one of the waves alone. The outputs developed when some waves of opposite type arrive coincidently between the output electrodes tend to cancel each other and, where two such waves of equal magnitude arrive coincidently between the output electrodes, no output is developed. In accordance with these principles various logical circuits are provided wherein the outputs may be developed in response to single sonic waves or combinations of the sonic waves which are caused to arrive coincidently between the output electrodes. The outputs are thus indicative of the time sequence in which inputs are applied.

The type of sonic wave produced, when one of a pair of input electrodes is pulsed to apply an electric field to the barium titanate therebetween, is dependent both upon the direction of spontaneous polarization in the material and the polarity of the electric field applied. Since a pulse of one polarity applied to one of a pair of input electrodes causes the material to be subjected to an electric field of a polarity opposite to that applied when a pulse of like polarity is applied to the opposite electrode, a universal logical switching element may be constructed to produce outputs in accordance with different logical combinations of inputs merely by employing switching means to cause the input pulses to be applied to different electrodes for different desired logical outputs.

According to a further embodiment of the invention a plurality of storage elements are provided on a single barium titanate crystal. Each storage element comprises a pair of electrodes on opposite faces of the crystal which, with the portion of the barium titanate therebetween, forms a ferrolectric capacitor. Such capacitors display a curve of polarization versus applied field which is in the form of a hysteresis loop and they exhibit two stable states of spontaneous polarization in opposite directions. Each ferroelectric capacitor can be caused to assume either one of these states by applying an electric field of sufficient magnitude and proper polarity and, when used as binary storage elements, one state of spontaneous polarization is designated to be the binary one state and the other the binary zero state. When a sonic wave is passed between the electrodes of such a storage capacitor, the polarity of the output developed is indicative of which of the remanent states the capacitor is in. A plurality of storage capacitors on a single element of barium titanate may be interrogated by applying an electric field between a pair of input or interrogation electrodes which are so located that the resulting sonic wave is propagated between each pair of storage capacitor electrodes. When the storage capacitors are equidistant from the input electrodes, the outputs are produced in parallel whereas, when the storage capacitors are located so that the interrogation sonic wave reaches each storage capacitor during a different time interval, the output is serial.

According to another embodiment, a decimal to binary decoder is constructed in accordance with the principles of the invention. The decoder includes four barium titanate elements each of which has connected thereto a plurality of pairs of input electrodes to which the decimal information pulses to be decoded are applied. Each barium titanate element is provided with a single pair of output electrodes between which outputs indicative of the decoding for one binary order are developed in response to input pulses applied to any of the input electrodes on that element.

Thus, an object of the invention is to provide novel piezoelectric and ferroelectric circuit elements.

A further object is to provide novel piezoelectric and ferroelectric elements which may be employed in performing logical switching functions.

Another object is to provide a storage element comprising a plurality of individual storage capacitors each of which is interrogated nondestructively in response to a sonic wave propagated in the element when an interrogation signal is applied to an input electrode on the element.

Another object of the invention is to provide a decimal to binary decoder wherein the outputs in binary form are developed in response to sonic waves propagated in piezoelectric elements to which input decimal information pulses are applied.

Other objects of the invention will be pointed out in the following description and claims and illustrated in the accompanying drawings, which disclose, by way of example, the principle of the invention and the best mode, which has been contemplated, of applying the principle.

Figure 6:
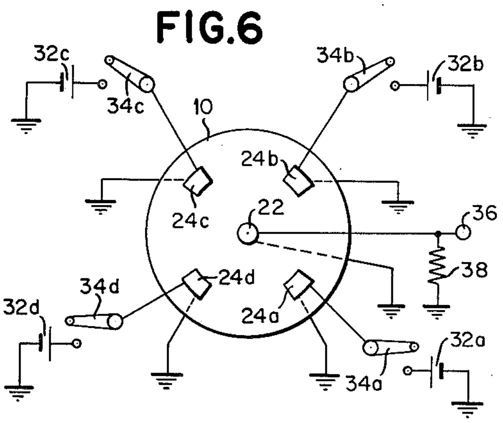
Figure 7:
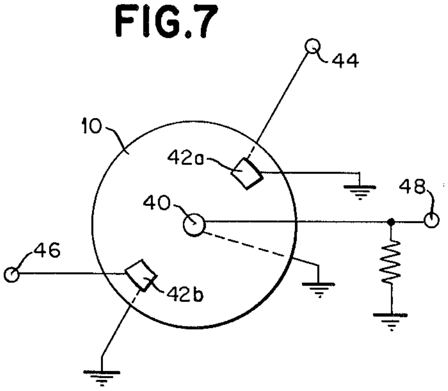
Figure 8:
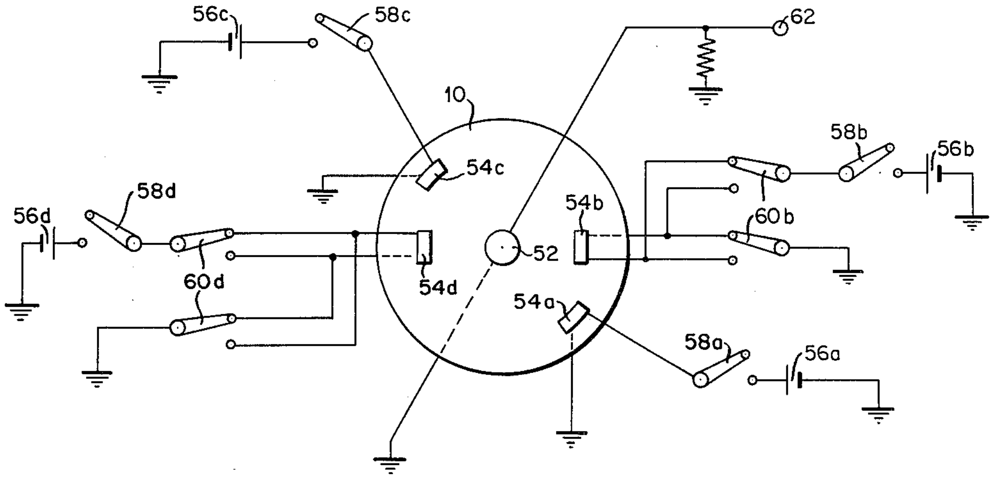

FIGS. 6, 7 and 8 diagrammatically illustrate different types of logical circuits constructed in accordance with the principles of the invention.

Figure 8A:
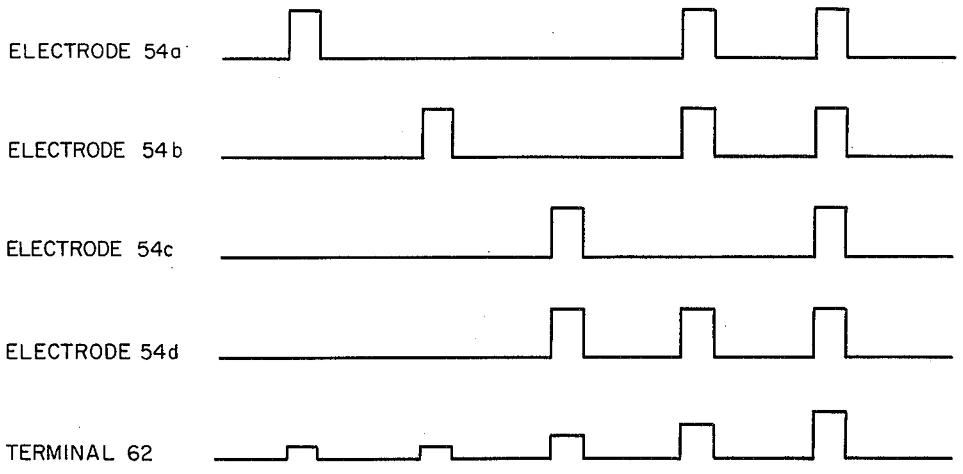
Figure 8B:
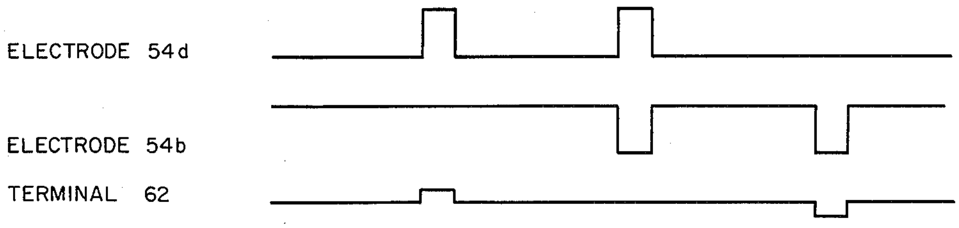
Figure 8C:
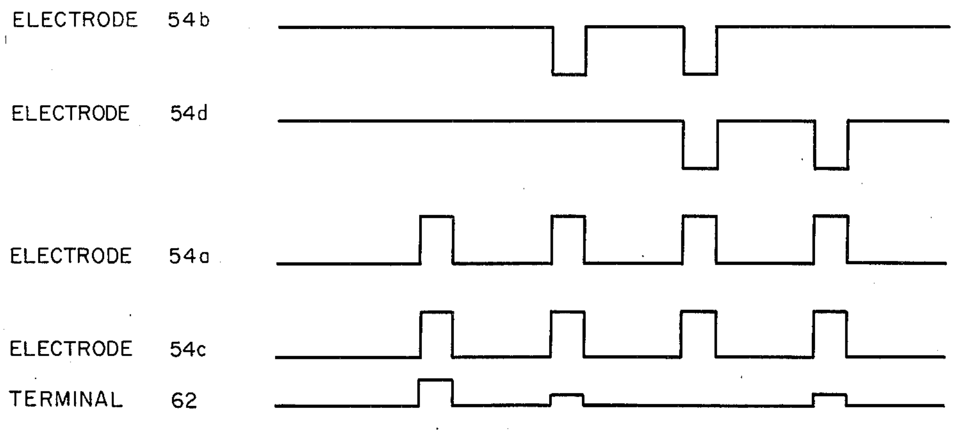

FIG. 8A, 8B and 8C are pulse diagrams which illustrate different modes of operation of the circuit of FIG. 8.

Figure 9:
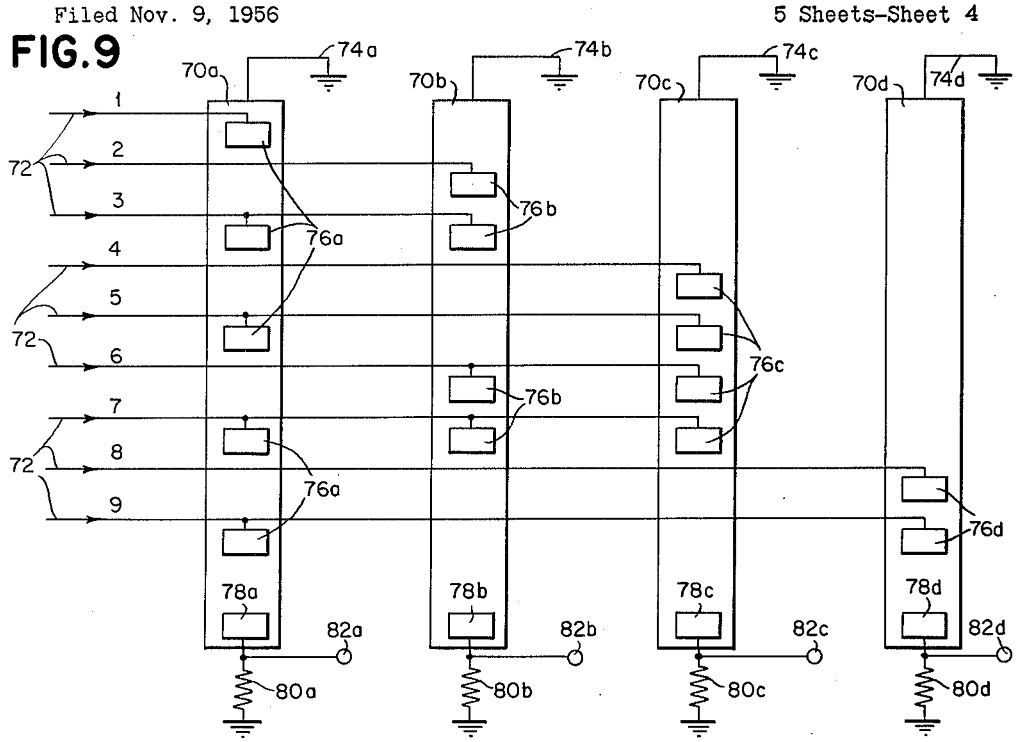
Figure 9A:
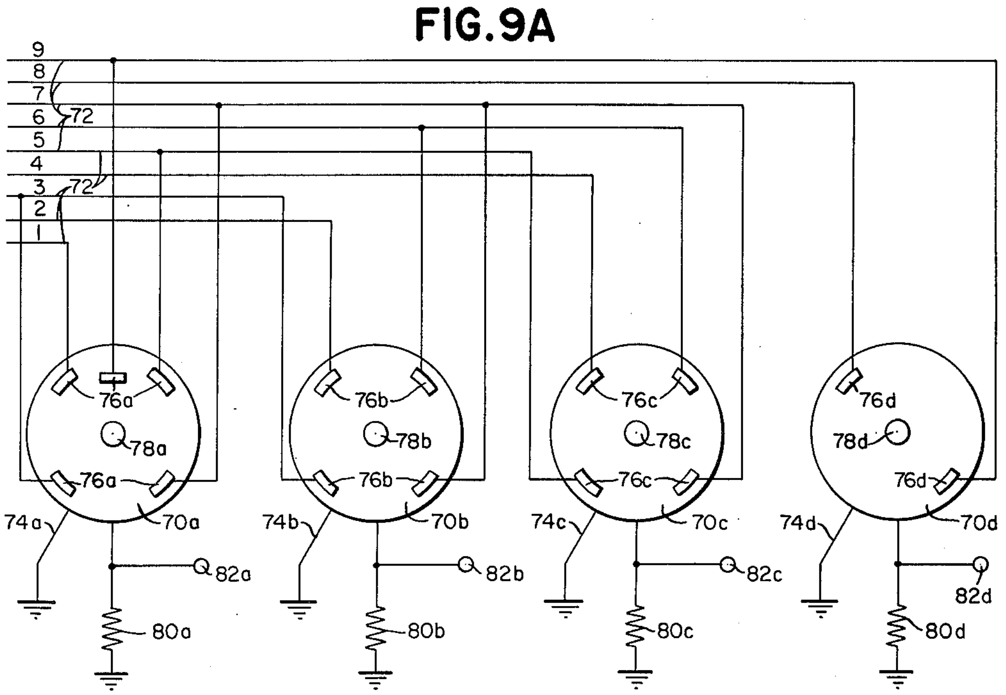

FIGS. 9 and 9A are diagrammatic showings of decimal to binary decimal decoder circuits constructed in accordance with the principles of the invention.

Figure 10:
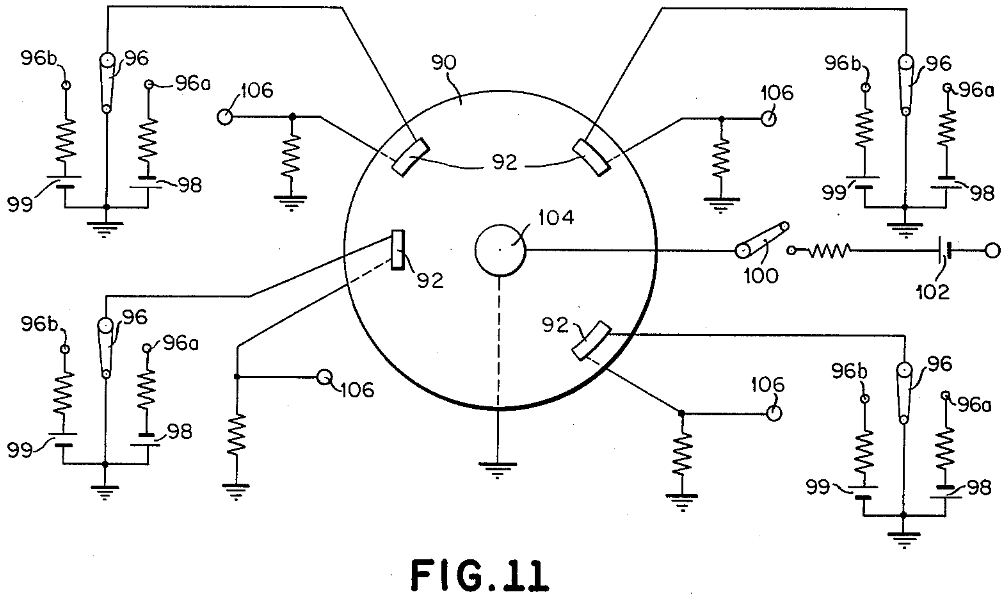

FIG. 10 is a diagrammatic showing of a memory circuit constructed in accordance with the principles of the invention.

Figure 11:
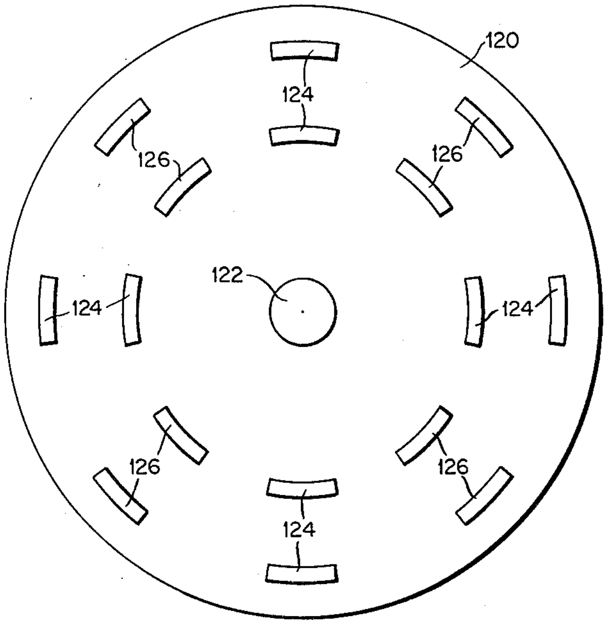

FIG. 11 is a diagrammatic showing of a memory circuit element usable in circuitry such as is shown in FIG. 10.

Figures 1, 2, 3, 4:
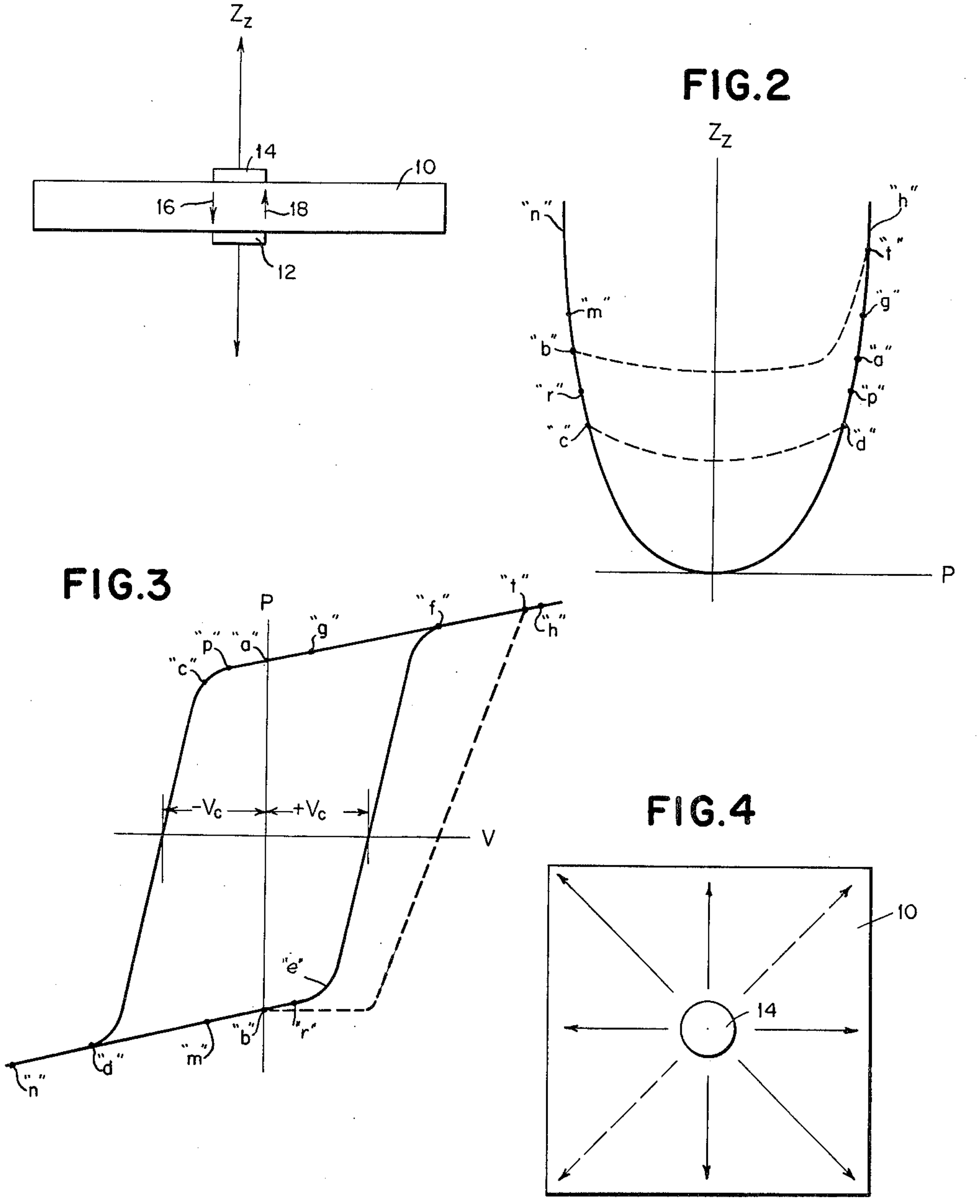
FIG. 1 is a diagrammatic showing of an electroded crystal of barium titanate.
FIG. 2 is a diagrammatic showing of the relationship between strained and polarization for a crystal of barium titanate.
FIG. 3 shows a hysteresis loop obtained by plotting polarization versus applied voltage for an electroded crystal of barium titanate.
FIG. 4 is a diagrammatic illustration showing different crystalline directions in which sonic waves are propagated when a centrally located portion of a barium titanate crystal is subjected to an electric field.

Referring now to FIG. 1, there is shown a crystal of barium titanate 10 which has connected to its opposite faces electrodes 12 and 14. The electrodes 12 and 14 together with the portion of crystalline barium titanate between them form a capacitor which, since the crystal has ferroelectric properties, is capable of assuming two stable states of remanent polarization in opposite directions. These stable states are represented at "*a*" and "*b*" on the hysteresis loop of FIG. 3, the letter "*a*" representing the remanent condition in the direction indicated by the arrow 16 in FIG. 1 and the letter "*b*" representing the remanent condition in the direction indicated by the arrow 18. The coercive voltage, which is the voltage necessary to reverse the direction of polarization in the crystal, is represented in FIG. 3 by the arrows designated $V_c$. When, with the crystal in the remanent condition indicated at "*a*," a negative pulse in amplitude greater than $V_c$ volts, is applied to electrode 14 in FIG. 1, the loop of FIG. 3 is traversed along the portion "*acd*" and, upon termination of the pulse, the barium titanate assumes the remanent state of polarization indicated at "*b*." If a positive pulse, in magnitude greater than $V_c$ volts, is then applied to electrode 14, the loop is traversed along the portion "*bef*" and, upon termination of the pulse, the barium titanate assumes the stable state of remanent polarization indicated at "*a*." When the pulses applied are less than the coercive voltage or are of incorrect polarity to switch the polarization, only the horizontal or saturation portions of the loop are traversed and, upon termination of the pulse the crystal assumes essentially its initial state of remanent polarization.

FIG. 2 illustrates graphically the relationship between changes in dimension and polarization which are effected in the crystalline barium titanate 10 between electrodes 12 and 14 when an electric field is applied between the electrodes. The vertical axis designated $Z_z$ represents dimensional changes in the vertical direction of the similarly designated arrows shown in FIG. 1. The horizontal axis P is representative of polarization in the barium titanate, polarization in the direction of the arrow 16 in FIG. 1 being plotted to the right in FIG. 2 and polarization in the direction of arrow 18 being plotted to the left. The parabolic nature of the curve of FIG. 2 indicates the electrostrictive relationship between deformation and applied electric field. When the bar of barium titanate is in a remanent condition at "*a*" of FIG. 3, the condition of strain and polarization is as represented by the same letter in FIG. 2. The remanent condition "*b*" on the hysteresis loop FIG. 3 is similarly represented by the same letter in FIG. 2. Note should be made of the fact that the dimensional state of the barium titanate is essentially the same for both remanent states, and, when in either of the remanent states indicated at "*a*" and "*b*," the relationship between dimensional and polarization changes effected by the application of a small field is essentially linear. When, with the material in the remanent condition "*a*," a voltage is applied to electrode 14 effective to cause the hysteresis loop of FIG. 3 to be traversed from "*a*" to "*g*," the relationship between applied voltage and polarization is essentially linear, as is the relationship between polarization and the dimensional changes effected in the barium titanate. The effect is similar for pulses of larger magnitude which are of a polarity to increase the initial remanent polarization in the barium titanate and changes effected in polarization and dimension for various voltages are indicated by the letters "*h*," "*m*," and "*n*" on FIGS. 2 and 3. The essential linearity of the relationship is due to the fact that the initial spontaneous polarization in the material is exceedingly large in comparison to the changes in polarization produced by the application of the electric fields. This magnitude of these changes relative to the initial spontaneous polarization is exaggerated in FIG. 2. It should be noted that in each of these cases where the applied pulse is of a polarity proper to increase the polarization in the material the deformation of the barium titanate is in the form of an expansion of the material in the "Z" direction indicated by arrows in FIG. 1. The relationship is similarly linear where the pulses applied to the crystalline barium titanate are of a polarity to reverse the direction of polarization in the barium titanate but are in magnitude less than the coercive voltage, that is a positive pulse applied to electrode 14 with the material initially in the remanent state at "*b*" in FIG. 3, or a negative pulse applied to electrode 14 with the material initially in the remanent state at "*a*" in FIG. 3. The excursions on the hysteresis loop and the corresponding changes in the plot of strain versus polarization are represented by the segments "*ap*" and "*br*" in FIGS. 2 and 3. Thus, where pulses in magnitude less than the coercive voltage are applied, the polarization changes are essentially proportional to the dimensional changes and change sign with them.

When, with the barium titanate in a remanent condition at "*a*" or "*b*," a pulse of proper polarity and sufficient magnitude to reverse the direction of polarization is applied to electrode 14 the relationships are as is depicted on the curves of FIGS. 2 and 3, nonlinear. However, though these curves are representative of the basic relationship between the plotted quantities they are not exact in depicting the relationships for all modes of operation. For example the hysteresis loop of FIG. 3 is representative of the relationship between polarization and voltage when a barium titanate crystal is subjected to an alternating voltage having a particular amplitude, frequency and wave shape. Most such loops are obtained by applying a sine wave signal having a frequency of 60 cycles per second. That such a plot does not represent with exactness the relationship between polarization and applied voltage is due to the fact that the switching phenomenon is dependent not only upon the amplitude of the signal applied, but upon the wave shape and duration of the signal at a particular amplitude level. Where, with the barium titanate in the remanent condition "*b*," a positive square pulse in magnitude much larger than the coercive voltage is applied to the crystal, the relationship between polarization and applied voltage during switching might better be represented by the dotted segment "*bt*." Once the polarization is switched, the continued application of the signal voltage causes the loop to be traversed along the portion "*th*."

Similarly, the curve of FIG. 2 would indicate that when the direction of polarization in the barium titanate is switched, the strain in the material is first reduced to a point where no strain exists and then the strain is increased again in the direction of the initial strain. Such is not the case and it is believed that with the application of a sine wave such as utilized in obtaining the hysteresis loop of FIG. 3, the relationship between strain and polarization is more correctly represented in FIG. 2 by the dotted curve extending from "*c*" to "*d*." When a square pulse, in magnitude much greater than the coercive voltage, is applied, the relationship between strain and deformation is believed to be more correctly represented by the dotted curve extending in FIG. 2 from "*b*" to "*t*." From this curve it may be seen that when such a pulse is applied, there is very little deformation in the "compression direction" as the polarization is reversed. Since the switching, upon the application of such a pulse, is accomplished in a very short time, this deformation is negligible and the primary dimensional change is an "expansion" which occurs as the applied pulse is increasing the polarization in the reverse direction. Thus, it may be seen that where pulses of this nature are applied the deformation produced is essentially the same whether the pulses are of a polarity proper to increase the initial direction of polarization or are of opposite polarity and effective to reverse the direction of polarization in the crystal.

Referring now to FIG. 4, there is shown a plan view of the electroded crystal of FIG. 1. When an electric field is applied to the barium titanate material between the electrodes 12 and 14, the resulting straining of this portion of the crystal causes sonic waves to be propagated outwardly in the remainder of the crystalline barium titanate. The vertically and horizontally extending arrows in this figure represent the [100] and [010] crystallographic directions in the barium titanate and, due to the tetragonal crystalline structure of this material at room temperature, the speed of propagation of sonic waves is the same in each of these directions. The diagonally extending arrows represent [110] crystallographic directions, which are located at 45° to [100] and [010] crystallographic directions. The speed of propagation of sonic waves in each of the [110] directions is the same and is approximately one and one-quarter that of the speed in the [100] and [010] directions.

Figure 5:
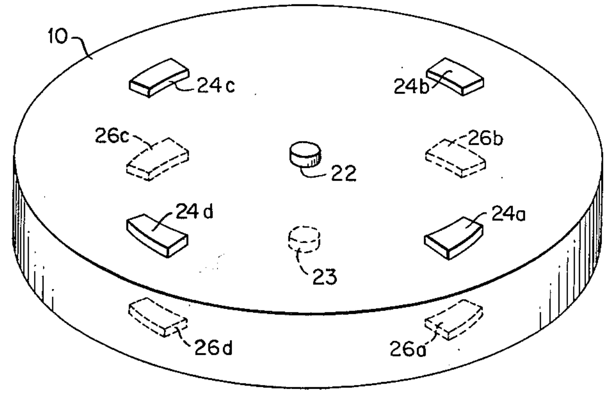
FIG. 5 illustrates one way in which electrodes may be attached to a crystal of barium titanate in constructing a circuit element in accordance with the principles of the invention.

FIG. 5 shows a crystal of barium titanate 20 having a pair of centrally located electrodes 22 and 23 and four pairs of electrodes **24*a* and 26*a*, 24*b* and 26*b*, 24*c* and 26*c* and 24*d* and 26*d*, mounted in circular fashion around electrodes 22 and 23. The crystal 10 is shown in circular form the purposes of illustration, it being obvious, of course, that the electrodes might be connected in the same manner to crystals having various configurations. In building logical circuits in accordance with the principles of the invention, single domain crystals of barum titanate which are essentially triangular in shape have been utilized to advantage. These crystals were grown in a butterfly configuration having two triangular wings. The crystal edges are found to be tapered and have many inclusions which serve to break up sonic waves reaching the edge of the crystal and prevent any appreciable spurious signals due to reflections. The electrodes 24*a* through 24*d*, and 26*a* through 26*d* are located on [110] axes of the crystal and are equidistant from the centrally located electrodes. Since the speed of propagation of a sonic wave is the same along each of these axes, a sonic wave propagated by straining the crystalline material between the electrodes 22 and 23 reaches the barium titanate between each of the pairs of circularly arranged electrodes at the same time. Similarly, if portions of barium titanate between two or more of the pairs of circularly arranged electrodes are strained at the same time, the sonic waves propagated will reach the centrally located electrodes at the same time. Thus, it may be said that the circularly arranged electrodes, which are physically equidistant from the centrally located electrodes, are also sonically equidistant from these electrodes. Further, pairs of electrodes may also be mounted sonically equidistant from electrodes 22 and 23. For example, pairs of electrodes might be mounted on the [010] axes of the crystal. Since the speed of sonic propagation is slower in the directions of this axis, these electrodes, in order to be sonically separated the same amount from electrodes 22 and 23** as the pairs of electrodes on the diagonal axes, would be mounted physically closer to the centrally located electrodes. In the description of the embodiments of the invention about to be given, where it is necessary that a plurality of pairs of electrodes be sonically equidistant from another pair of centrally located electrodes, the electrodes are generally shown to be mounted on axes along which the speed of sonic propagation to and, from the centrally located electrodes is the same and thus, these electrodes are physically equidistant from the centrally located electrodes. From the explanation given above, it is obvious that the same effect may be achieved where the electrodes are mounted on axes along which the speed of sonic propagation is different, in which case the physical distance between the centrally located electrodes and the other electrodes varies. Further, it should here be noted that where it is desired to provide a structure wherein two pairs of electrodes are mounted so as to be sonically equidistant from a third pair of electrodes, the circular configuration is not necessary and all three pairs of electrodes might, for example, be mounted in a straight line on a bar of barium titanate.

Referring now to FIG. 6, there is diagrammatically shown a four input INCLUSIVE OR circuit constructed in accordance with the principles of the invention. Input pulses to the INCLUSIVE OR circuit are supplied by batteries 32*a*, 32*b*, 32*c* and 32*d*, each of which is connected under control of one of four switches 34*a*, 34*b*, 34*c* and 34*d* to one of the electrodes 24*a* through 24*d*. Each of the electrodes 26*a* through 26*d* (not shown in FIG. 6) is connected to ground. Though the input pulses to the circuit are, for simplicity of illustration, shown to be applied by batteries under control of manually operated switches, it is, of course, obvious that the inputs may be supplied by high speed electromechanical or electronic circuitry. The outputs of the INCLUSIVE OR circuit are manifested at a terminal 36, which is connected to the top one of the centrally located electrodes, the opposite electrode 23 (not shown in FIG. 6) being connected to ground.

Let us assume that the entire crystal 10 of FIG. 6 is initially in the remanent condition at "*a*" of FIG. 3. If, with the crystal in this condition, switch 34*a* is momentarily closed and then opened to allow battery 32*a* to apply a positive pulse to electrode 24*a*, the barium titanate between electrodes 24*a* and 26*a* is subjected to a polarizing field which tends to increase the polarization in the direction of the initial spontaneous polarization. In order that the effect produced be piezoelectric and, therefore, linear, the batteries 32*a*, 32*b*, 32*c* and 32*d* are chosen to be effective to apply to the electrodes voltage pulses which are less in magnitude than the coercive voltage for the barium titanate. Thus, the pulse applied, when switch 34*a* is operated as above described, causes a change in polarization in the barium titanate between electrodes 24*a* and 26*a* which is represented on the hysteresis loop of FIG. 1 by the segment "*ag*." It should here be noted that, in the description to follow of this and other embodiments, the pulses applied to cause sonic waves to be propagated in the material are, unless otherwise stated, in magnitude less than the coercive voltage for the material. As is shown in FIG. 2, this change in polarization causes the barium titanate between input electrodes 24*a* and 26*a* to be expanded thereby causing a sonic wave which tends to expand the barium titanate to be transmitted in the material. This expansion wave, as it passes through the portion of the barium titanate crystal between output electrodes 22 and 23, also causes this portion of the material to be expanded thereby momentarily increasing the polarization in this portion of the barium titanate and causing a voltage to be developed between the output electrodes. The output of the circuit is developed across an impedance element 38 and manifested at output terminal 36. Here, where the barium titanate is initially in remanent state "*a*," which is the remanent state of polarization in the downward direction from the top surface of the crystal 10 shown in FIG. 6, the output pulse manifested at terminal 36 is positive. When the input pulse supplied by battery 32*a* is terminated, the barium titanate between electrodes 24*a* and 26*a* reassumes the initial remanent state at "*a*" thereby causing a sonic wave tending to compress the barium titanate to be propagated in the crystal and causing a subsequent negative pulse to be developed at terminal 36.

The operation is the same when any of the other switches 34*b*, 34*c*, or 34*d* is operated and since each pair of input electrodes is sonically equidistant from the output electrodes, the operation of any of the switches is effective to cause an output to be developed at terminal 36 after the same predetermined time delay. Where two or more of the switches are simultaneously operated, each of the sonic waves tending to expand the barium titanate pass between the output electrodes at the same time. Since the converse piezoelectric effect is also linear, the output developed when two switches are operated is twice that developed when only one switch is operated, and when three switches are operated is three times that developed when only one switch is operated, etc. The circuit meets the requirements of an INCLUSIVE OR circuit since it is capable of producing an output at terminal 36 when any one or more of the input electrodes is pulsed.

Since the magnitude of the outputs developed varies linearly with the number of input pulses applied, the circuit of FIG. 6 may be utilized as an AND circuit wherein the signal to noise ratio is 2 to 1. For example, if we consider that the electrodes 24*a* and 24*b* are input electrodes to an AND circuit, the application of pulses coincidently to both of these electrodes causes an output to be developed at terminal 36 which is twice that developed when only one input electrode is pulsed. Since the output for a coincident application of inputs is twice that for the application of a single input, the outputs are distinguishable and the circuit meets the requirements of an AND circuit. The structure of FIG. 6 may be utilized to provide two AND circuits operable to produce outputs during different time intervals. The output of each AND circuit is developed between electrodes 22 and 23 and manifested at terminal 36, the inputs to one AND circuit being applied, for example, to input electrodes 24*a* and 24*b* and the inputs to the other AND circuit being applied to the input electrodes 24*c* and 24*d*. It should be noted that where, as in the embodiment of FIG. 6, all of the inputs are applied to electrodes on one side of the crystal and all of the electrodes on the other side of the crystal 10 are connected directly to the same reference potential, which is here ground, one side of the crystal may be completely covered with a single electrode which is connected to the reference potential.

FIG. 7 diagrammatically shows an EXCLUSIVE OR circuit constructed in accordance with the principles of the invention. The structure includes a crystal of barium titanate 10, shown in a top view, having on one side a centrally located output electrode 40 and input electrodes 42*a* and 42*b*. Opposite each of these electrodes is another electrode not visible in the showing of FIG. 7. Assuming the entire crystal 10 to be in a remanent state of polarization in the "down" direction, which state is represented at "*a*" in FIG. 1. Inputs to the circuit are applied by appropriate pulse supplying circuitry to a pair of input terminals 44 and 46. Terminal 46 is connected to electrode 42*b*, which is on the top surface of the crystal 10, and terminal 44 is connected to the electrode on the bottom face opposite electrode 42*a*. The input pulses applied are of the same polarity and where, for example, a positive input pulse is applied to terminal 46, in a manner similar to that explained with reference to FIG. 6, an expansion sonic wave is transmitted between electrode 40 and the other output electrode on the bottom face of the crystal, causing a positive output pulse to be developed at an output terminal 48. When a positive pulse is applied to terminal 44, and thus to the electrode opposite electrode 42*a*, the piezoelectric effect is opposite. Such a pulse decreases the polarization between these input electrodes and causes a compression wave to be transmitted in the barium titanate and between the output electrodes. The resulting voltage developed between the output electrodes causes a negative pulse to be manifested at terminal 48. Thus, where a pulse is applied to either one of the input terminals, exclusively, an output pulse is developed at terminal 48 after a predetermined time interval. As in the embodiment of FIG. 6, each output pulse is followed by a pulse of opposite polarity which is developed in response to the sonic wave propagated when the barium titanate between the input electrodes returns to its initial remanent condition upon the termination of an input pulse. Where pulses are applied simultaneously to both terminals 44 and 46, the expansion and compression waves reach the barium titanate between the output terminals at the same time and substantially cancel each other so that no appreciable voltage is developed between the output electrodes and no output manifested at terminal 48. The same result may be achieved with the application of input pulses to both of the electrodes 42*a* and 42*b* on the top surface of the crystal by initially polarizing the barium titanate beneath these electrodes in different directions. Thus, the barium titanate beneath electrode 42*a* might be initially polarized in the "down" direction and that beneath electrode 42*b* in the "up" direction.

FIG. 8 is a diagrammatic showing of a universal circuit element constructed in accordance with the principles of the invention. The circuit includes a crystal 10 of barium titanate having a pair of centrally located output electrodes 52 and four pairs of input electrodes 54*a*, 54*b*, 54*c*, 54*d*, the electrodes on the lower face of the crystal not being visible in the drawing. Electrodes 54*a* and 54*c* are located on one crystalline axis and electrodes 54*b* and 54*d* on another crystalline axis. The speed with which sonic waves are transmitted is faster along the axis on which electrodes 54*a* and 54*c* are situated than along the axis on which electrodes 54*b* and 54*d* are located. The electrodes 54*a* and 54*c* are physically spaced from the output electrodes a greater distance than the electrodes 54*b* and 54*d* so that the four pairs of electrodes are sonically equidistant from the output electrodes. Input pulses are supplied to the circuit by batteries 56*a*, 56*b*, 56*c* and 56*d* under control of switches 58*a*, 58*b*, 58*c* and 58*d*. Batteries 56*a* and 56*c* are connected directly through switches 58*a* and 58*c* to the upper electrodes 54*a* and 54*c*. Another pair of switches 60*b* and 60*d* are provided in the input circuits to batteries 56*b* and 56*d*. With these switches in the condition shown, the batteries 56*b* and 56*d* are effective, when switches 58*b* and 58*d* are operated, to apply positive pulses to the top electrodes 54*b* and 54*d*. With switches 60*b* and 60*d* in the position shown, the circuit of FIG. 8 is a four input INCLUSIVE OR circuit operable in the same manner as was described with reference to FIG. 6. Since the magnitude of the output developed is dependent on the number of inputs coincidently applied, the circuit may be also utilized as an AND circuit. Illustrative pulse forms, which are applied to the various input electrodes to cause outputs to be developed between electrodes 52 and manifested at an output terminal 62, are shown in FIG. 8A. In this figure as in the other pulse diagrams about to be described, positive pulses applied to the top input electrodes are shown as positive pulses. Further, only the output pulses developed by the sonic wave produced by the leading edges of the input pulses are shown and in order to more graphically illustrate the outputs produced for various combinations of input pulses, and the output pulses are shown to be produced coincidently with the application of the input pulses, it being understood that there is a fixed time delay in each case between the application of one or more input pulses and the output pulse thereby produced.

Now if switch 60*b* is transferred, the upper one of electrodes 54*b* is connected to ground and battery 56*b* is effective, when switch 58*b* is operated, to apply a positive pulse to the lower one of the electrodes 54*b* which is not visible in the figure. With switch 60*b* in this condition electrode 54*b* and any one of the other input electrodes may be utilized as inputs to an EXCLUSIVE OR circuit such as is shown and has been described with reference to FIG. 7. A pulse diagram illustrating the input pulses and output pulses where inputs are supplied under control of switches 58*b* and 58*d* is shown in FIG. 8B. The positive pulses applied to the lower one of the electrodes 54*b* are there shown as negative pulses since the application of a positive pulse to the lower electrode 54*b* has the same effect as would the application of a negative pulse to the top electrode.

Now, if switch 60*d* is transferred so that the upper one of electrodes 54*d* is connected to ground, battery 56*d* is effective when switch 58*d* is operated to apply a positive pulse to the lower electrode 54*d* and the circuit of FIG. 8 may be utilized as a logical AND NOT circuit. In this type of logical circuit, it is necessary to produce an output during each cycle of operation in which inputs are applied to either one or the other of two input terminals or when no input is applied to either input terminal. When inputs are applied to both input terminals, no output is produced. When the circuit is thus utilized, clock pulses are applied to electrodes 54*a* and 54*c* during each cycle of operation and the selective inputs are applied to electrodes 54*b* and 54*d*. The pulse diagram of FIG. 8C illustrates the input and output pulses for this mode of operation. The same logical circuit can be achieved using only three input electrodes where the clock pulse applied is in magnitude twice that of the selectively applied input pulses. For example, if battery 56*c* were chosen to be effective to apply pulses in magnitude twice that of the pulses applied by batteries 56*b* and 56*d*, then the circuit of FIG. 8 is operative as an AND NOT circuit without using electrodes 54*a* and the circuitry connected thereto.

FIG. 9 diagrammatically illustrates the manner in which a decimal to binary decimal decoder is constructed in accordance with the principles of the invention. The decoding is accomplished in accordance with the following table:

| Decimal Digit | First Binary Order | Second Binary Order | Third Binary Order | Fourth Binary Order |
|---|---|---|---|---|
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

The decoder includes four bars of barium titanate 70*a*, 70*b*, 70*c* and 70*d*, one for each of the binary orders. Inputs to the decoder are applied to the leads 72, there being nine such leads, one for each of the decimal digits one through nine. Pulses representative of the different decimal digits are applied to the correspondingly designated leads 72. Each of the bars 70*a* 70*b*, 70*c* and 70*d* has its lower face (not shown) completely electroded and connected by a corresponding lead 74*a*, 74*b*, 74*c*, 74*d* to ground. Each electrode has connected to its upper face a plurality of input electrodes 76*a*, 76*b*, 76*c*, 76*d*. The input lines are connected to these input electrodes in accordance with the table set out above. The bar 70*a*, which is the bar for the first binary decimal order, has input electrodes 76*a* connected to the leads 72 to which pulses representative of the decimal digits 1, 3, 5, 7 and 9 are applied; the bar 70*b* for the second binary decimal order has input electrodes 76*b* connected to the leads 72 to which pulses representative of the decimal digits 2, 3, 6 and 7 are applied; etc. There are four output electrodes 78*a*, 78*b*, 78*c*, and 78*d*, one on each of the bars and each is connected through one of the impedance elements 80 to ground. The decoded outputs are manifested at output terminals 82*a*, 82*b*, 82*c* and 82*d*.

When a pulse, representative of a decimal digit one, is applied to the proper lead 72, the barium titanate beneath the upper electrode 76*a* on bar 70*a* is strained causing a sonic wave to be transmitted in that bar. An output is then developed between output electrode 78*a* and the lower electrode on this bar and manifested at terminal 82*a*. Similarly, when a pulse is applied to the lead representing decimal digit 2, an output is manifested at terminal 82*b*. The lead 72, to which pulses representative of the decimal digit 3 are applied, is connected to electrodes on bars 70*a* and 70*b* and thus when a pulse is applied to this lead, outputs are developed at both terminal 82*a* and terminal 82*b*. The operation is similar when pulses are applied to the other digit representing leads. A pulse applied to any lead 72 is effective to cause a sonic wave to be transmitted in each bar which has an input electrode connected to that lead. An output is developed at the output electrode on each bar in which a sonic wave is produced, which output is manifested at the corresponding output terminal. Since the various electrodes on each bar are spaced different amounts from the output electrode on the bar, the outputs produced for input pulses applied to different ones of the leads 72 are manifested at terminal 82*a*, 82*b*, 82*c* and 82*d* after varying time delays. However, each of the outputs is produced within a predetermined time interval following the application of the input pulse. The extent of this time interval is determined by the time delay after which outputs are manifested at terminal 82*a* and 82*b* when a pulse representative of the digit 9 is applied to the proper one of the leads 72 and by the time delay after which an output is manifested at terminal 82*a* when a pulse representative of the digit 1 is applied to the proper one of the leads 72.

FIG. 9A shows an embodiment of a decimal to binary decimal decoder wherein all the outputs are produced in response to input decimal digital information pulses after the same time delay. Corresponding elements in FIGS. 9 and 9A are given the same reference numerals. The operation of the circuitry is the same with the exception that the output electrodes 78*a*, 78*b*, 78*c* and 78*d* on the elements 70*a*, 70*b*, 70*c* and 70*d* are now centrally located and are sonically equidistant from the input electrodes 76*a*, 76*b*, 76*c* and 76*d*. As a result sonic waves propagated in the elements, when pulses are applied to any input electrodes cause an output to be developed at the output terminal after the same time delay.

FIG. 10 shows a storage circuit constructed in accordance with the principles of the invention. Ferroelectric capacitors are capable of storing binary information as is shown in Patent No. 2,717,372, issued September 6, 1955, to J. R. Anderson. This patent also illustrates the fact that a single crystal of barium titanate may be utilized as the dielectric for a plurality of ferroelectric storage capacitors. Four such storage capacitors are constructed in FIG. 10 using a crystal 90 of barium titanate. Each storage capacitor is formed by one of the four electrodes 92, shown to be mounted on the upper face of the crystal, and one of four similar electrodes mounted on the bottom surface of the crystal opposite electrodes 92, together with the portion of barium titanate between the opposing electrodes. Each of these capacitors is capable of being caused to assume one or the other of the two remanent conditions of polarization shown at "*a*" and "*b*" in FIG. 3. Inputs to the storage capacitors are supplied under the control of switches 96. With the switches 96, which are connected to the upper electrodes of the storage capacitors, in the position shown, these electrodes are maintained at ground potential and, since each of the lower electrodes is connected to ground, there is then no voltage drop across the capacitors. If we consider that the remanent condition at "*b*" in FIG. 3 is the binary zero representing condition, and the remanent condition "*a*" is the binary one representing condition, the capacitors may be set in the binary zero condition by transferring switches 96 to contact terminals 96*a* and thereby allow the batteries 98 to apply negative voltages to the electrodes 92. The batteries 98 are chosen so that they are effective, when switches 96 are operated to contact terminals 96*a*, to apply to electrodes 92 a voltage in magnitude greater than the coercive voltage for the material. The batteries 98 are thus effective, when switches 96 are operated in this manner to apply a negative pulse to electrodes 92, to cause each of the storage capacitors to assume the binary zero representing condition at "*b*" in FIG. 3. Information is similarly read into the storage capacitors under control of the switches 96. When it is desired to read a zero into any particular capacitor, the associated switch 96 is not operated but is left in the condition shown and that capacitor remains in the binary zero representing condition at "*b*." When it is desired to read a binary one into any one of the storage capacitors the associated switch 96 is operated to contact terminal 96*b* and allow a battery 99 to apply a positive voltage, larger in magnitude than the coercive voltage for the capacitor, to the connected electrode 92. Operation of any of the switches 96 in this manner causes the associated capacitor to assume the binary one representing condition at "*a*" on the hysteresis loop of FIG. 1.

When, after information has thus been stored in the various storage capacitors, the capacitors may be interrogated by operating a switch 100 to allow a battery 102 to apply a positive pulse to the upper one of a pair of centrally located electrodes 104. The lower electrode 104 (not visible in FIG. 10) is connected to ground. Assuming the barium titanate between electrodes 104 to be initially in the remanent condition "*a*" on the hysteresis loop of FIG. 3, the pulse applied by battery 102 is of a magnitude to cause a polarization change represented by the segment "*ag*." This change in polarization, as is indicated in FIG. 2, causes the barium titanate between electrodes 104 to be expanded and thereby causes expansion waves to be propagated in the barium titanate crystal. The storage capacitor electrodes 92 are located sonically equidistant from the electrodes 104 so that these sonic waves pass between each pair of storage capacitors electrodes at the same time. The barium titanate between capacitor electrodes 92 is thus expanded. This expansion causes a voltage to be developed between each pair of electrodes 92 and an output to be manifested at a corresponding output terminal 106. The polarity of the output pulses developed is dependent upon the direction of spontaneous polarization in the barium titanate and thus upon the binary information stored in each capacitor. For example, where a storage capacitor is in the binary zero representing condition at "*b*" and thus is in the remanent state of polarization in the "up" direction, the polarity of the output pulse developed at the output terminal 106 for that capacitor is positive. Conversely where a storage capacitor is in the binary one representing condition the output pulse manifested at the connected output terminal 106 is negative.

When the interrogation pulse applied by battery 102 is terminated, sonic waves tending to compress the material are propagated in the crystal 90. These waves cause pulses to be developed at terminal 106 which are of a polarity opposite to that initially produced in response to the sonic wave propagated when the interrogation pulse is initially applied. Because the electrodes 92 are sonically equidistant from the electrodes 104, both the pulses produced in response to initial application of the interrogation pulse and the pulses produced in response to the termination of the interrogation pulse occur at terminals 106 at the same time. The output may be gated so that either the first or second group of pulses are representative of the information stored in the memory capacitors. After the sonic waves have passed, the storage capacitors reassume their initial states and the interrogation is, thus, nondestructive.

FIG. 11 shows a further embodiment of a storage circuitry constructed in accordance with the principles of the invention. In this embodiment the barium titanate crystal 120 serves as the dielectric for 16 storage capacitors and one capacitor which is utilized to cause sonic interrogation waves to be propagated in the material. The top electrode of the interrogation capacitor is designated 122. The top electrodes of the storage capacitors are as shown arranged in two circles. In each circle there are on the top face of the crystal four electrodes 124, two located on the [100] crystalline axis and two located on the [010] crystalline axis and four electrodes 126 located on [110] axes of the crystal. A similar arrangement of electrodes is provided on the lower face of the crystal. Though not shown, each storage capacitor has associated therewith circuitry similar to that shown connected to electrodes 92 in FIG. 10 which is operable to apply pulses to restore and read information into the capacitors and to develop outputs indicative of the information stored in the capacitors. Similarly there is connected to electrodes 122 circuitry similar to that connected to electrodes 104 in FIG. 10. After information is read into the storage capacitors, all may be interrogated by applying a pulse to electrode 122 to cause sonic waves to be transmitted in the crystal 120. Since the sonic waves travel faster on the [110] axes, the sonic waves pass between the electrodes 126 in the inner circle first causing outputs to be coincidently manifested at the output terminals coupled to these electrodes during a first time interval after the application of the interrogation pulse. The construction is such that the sonic waves pass through the barium titanate between the electrodes 124 in the inner circle during a second time interval, between electrodes 126 in the outer circle during a third time interval and between electrodes 124 in the outer circle during a fourth time interval. If for example, each group of four storage capacitors represents a decimal digit in the binary decimal notation, the four information bits representative of each decimal number are read out during the same time interval and the four different groups of information bits representative of the four digits are read out during successive time intervals.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A logical circuit element comprising a body of material having the property that an applied polarizing field is effective to strain said material and an applied strain is effective to produce a change in polarization in said material; first, second, third, and fourth individual pairs of electrodes on said body; one electrode of each of said pairs of electrodes secured to a first major face of said body and the other of each of said pairs of electrodes secured to a second major face of said body opposite said first major face of said body; said first, second, third, and fourth pairs of electrodes being separated by first, second, third, and fourth portions of said body of material, respectively; and said first, second, and third portions of said body of material being sonically equidistant from said fourth portion of said body of material, whereby polarizing fields simultaneously applied by any of said first, second, and third electrode pairs effective to strain said first, second, and third portions of said body of material, respectively, generate sonic waves all of which thereafter simultaneously strain said fourth portion of said body of material.

2. A circuit element comprising a body of ferroelectric material; said body having first and second opposite faces and including first, second, third, fourth, and fifth portions of said material transverse to said faces: first, second, third, fourth, and fifth individual electrodes on said first face opposite said first, second, third, fourth, and fifth portions, respectively, and sixth, seventh, eighth, ninth, and tenth individual electrodes on said second face opposite said first, second, third, fourth, and fifth portions, respectively; said portions being so located that a line from said first to said third portion of said material extends in the direction of a first crystallographic axis of said material and a line from said second to said fourth portion of said material extends in the direction of a second crystallographic axis of said material; said fifth portion positioned at the intersection of said first and second lines and sonically equidistant from each of said first, second, third, and fourth portions.

3. The circuit element of claim 2 wherein the velocity of sonic wave propagation in the direction of said first crystallographic axis is different than the velocity of sonic wave propagation in the direction of said second crystallographic axis.

4. The circuit element of claim 2 wherein the velocity of sonic wave propagation in the direction of said first and second crystallographic axes is the same.

5. A logical circuit comprising a ferroelectric body of material; first, second, and third individual input means associated with said body and controllable to apply signals to first, second and third separate portions of said body, respectively, both coincidently and exclusively; the characteristics of said material being such that signals applied by said first, second, and third means are effective to cause sonic waves to be propagated in a fourth portion of said body; said fourth portion of said body being sonically equidistant from each of said first, second, and third portions of said body, whereby signals coincidently applied by said first, second, and third means thereafter cause coincident sonic waves in said fourth portion; and output means associated with said fourth portion of said body for manifesting outputs in response to said sonic waves indicative of the time sequence in which signals are applied by said input means.

References Cited in the file of this patent

UNITED STATES PATENTS

| | | |
|---|---|---|
| 1,450,246 | Cady | Apr. 3, 1923 |
| 1,930,536 | Piersol | Oct. 17, 1933 |
| 1,975,517 | Nicolson | Oct. 2, 1934 |
| 2,262,966 | Rohde | Nov. 18, 1941 |
| 2,386,279 | Tibbetts | Oct. 9, 1945 |
| 2,472,179 | Tibbetts | June 7, 1949 |
| 2,509,478 | Caroselli | May 30, 1950 |
| 2,546,321 | Ruggles | Mar. 27, 1951 |
| 2,628,335 | Drake | Feb. 10, 1953 |
| 2,659,869 | Allison | Nov. 17, 1953 |
| 2,702,472 | Rabinow | Feb. 22, 1955 |
| 2,711,515 | Mason | June 21, 1955 |
| 2,736,881 | Booth | Feb. 28, 1956 |
| 2,742,614 | Mason | Apr. 17, 1956 |
| 2,782,397 | Young | Feb. 19, 1957 |
| 2,793,288 | Pulvari | May 21, 1957 |
| 2,806,155 | Rotkin | Sept. 10, 1957 |
| 2,815,490 | De Faymoreau | Dec. 3, 1957 |
| 2,830,274 | Rosen et al. | Apr. 8, 1958 |
| 2,872,577 | Hart | Feb. 3, 1959 |
| 2,888,666 | Epstein | May 26, 1959 |

FOREIGN PATENTS

| | | |
|---|---|---|
| 753,274 | Great Britain | July 18, 1956 |

OTHER REFERENCES

Proceedings of the I.R.E., October 1953, p. 1403 (by Eckert).